INVENTOR
WALTER J. ZENNER
BY R. C. Perry
ATTORNEY

INVENTOR
WALTER J. ZENNER
BY R. C. Terry
ATTORNEY

INVENTOR
WALTER J. ZENNER
BY R.C. Terry
ATTORNEY

INVENTOR
WALTER J. ZENNER
BY R. C. Terry
ATTORNEY

INVENTOR
WALTER J. ZENNER
BY R. C. Terry
ATTORNEY

INVENTOR
WALTER J. ZENNER
BY R.C. Terry
ATTORNEY 3,014,093

PRINTING TELEGRAPH STORAGE TRANSMITTER WITH CARD READER AND HANDLING MECHANISM

Walter J. Zenner, Des Plaines, Ill., assignor to Teletype Corporation, Chicago, Ill., a corporation of Delaware Filed Sept. 13, 1959, Ser. No. 840,938
12 Claims. (Cl. 178—17.5)

This invention relates to printing telegraph storage transmitters and more particularly to a current-controlled transmitter for transmitting a selected message as determined by a selected card.

In printing telegraph systems, it is frequently desirable to transmit any one of a plurality of discrete, non-varying message portions at frequent intervals and if such procedure can be performed automatically, it will relieve an operator of the responsibility for repeatedly setting up this message portion on a keyboard. Furthermore, if such message portions can be transmitted automatically, the possibility of an error is appreciably reduced. Such discrete, non-varying messages may comprise a single sentence or an address composed of a series of numbers or letters which are used at frequent intervals.

It is an object of the present invention to provide a printing telegraph storage transmitter of simple construction for automatically transmitting any one of a plurality of discrete and fixed messages.

A further object of the invention is the provision of a storage transmitter for printing telegraph apparatus which may be controlled by permutation code perforations in a card.

A still further object of the invention is the provision of a printing telegraph storage transmitter operable under control of cards in a magazine of cards wherein each card has a discrete message portion in it in the form of permutation code perforations.

More specifically, it is an object of the present invention to provide a printing telegraph storage transmitter wherein an operator may select any one of a plurality of cards in a card magazine and move a portion of the card having permutation code perforations in it into a reader and wherein the reader will return the card to the position it originally occupied in the magazine.

In accordance with one embodiment of the invention, a plurality of cards, each having a discrete message portion in it, in the form of permutation code perforations, are stored in a rotatable magazine in such manner that each card may be separately tilted out of its normal position in the magazine to a position where the portion of it containing the permutation code perforations will enter into a slot in a reader. The insertion of a card into the reader automatically releases a card locating plunger which holds the card in a position to be traversed by a carriage carrying a plurality of sensing pins which will sense the code perforations in the card during the travel of the carriage and will actuate a set of contacts to temporarily store the sensed information. At the completion of the travel of the carriage across the card to read the code perforations therein, the carriage will initiate the actuation of means for withdrawing the locating plunger from the card, means for returning the card to its original position in the magazine and means for restoring the carriage to position to move the sensing pins across a card which may later be inserted in the reader. The contacts actuated by the sensing pins control a distributor which may either impress signals on a signal line or direct them to a tape reperforator which will perforate the stored information into a tape for further utilization in a telegraph system.

A more complete understanding of the invention may be had by reference to the following detailed description when considered in conjunction with the accompanying drawings wherein.

Figure 1:
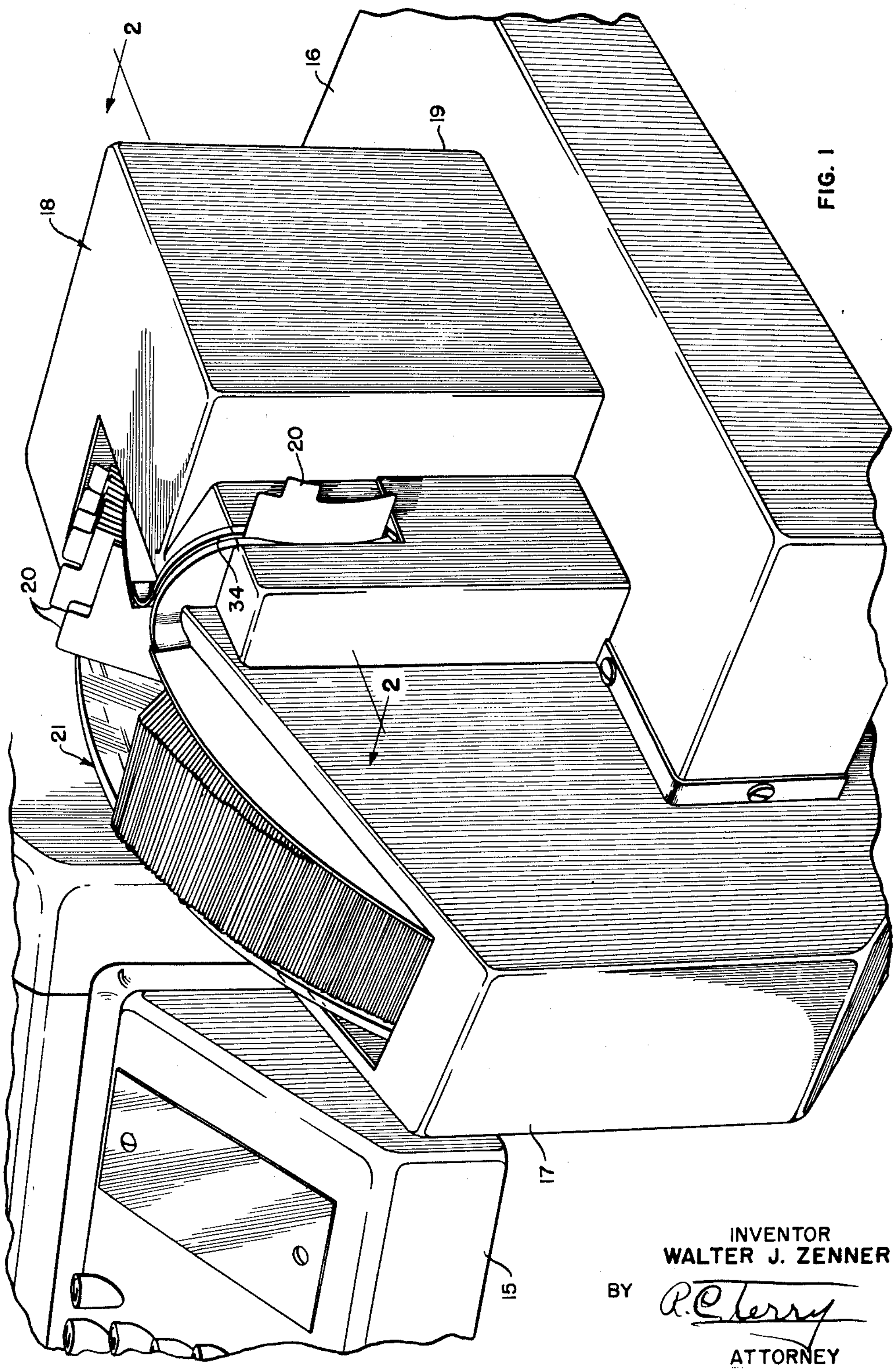
FIG. 1 is a fragmentary perspective view of a printing telegraph page printer having mounted on it a storage transmitter mechanism constituting the present invention.

Referring now to the drawings, wherein like reference characters designate the same parts throughout the several views, particular reference being had to FIG. 1 wherein there is shown a portion of a key controlled page printing, sending and receiving printing telegraph apparatus 15 which has been provided with a base member 16 on which there is mounted a main support plate 17. Substantially all of the mechanism of a reader, designated generally by the numeral 18, is supported on the main support plate 17, and is enclosed in a suitably formed cover 19 as shown in FIG. 1. This cover is not shown in the other figures so that the structural features of the apparatus may be more clearly illustrated.

Figure 4:
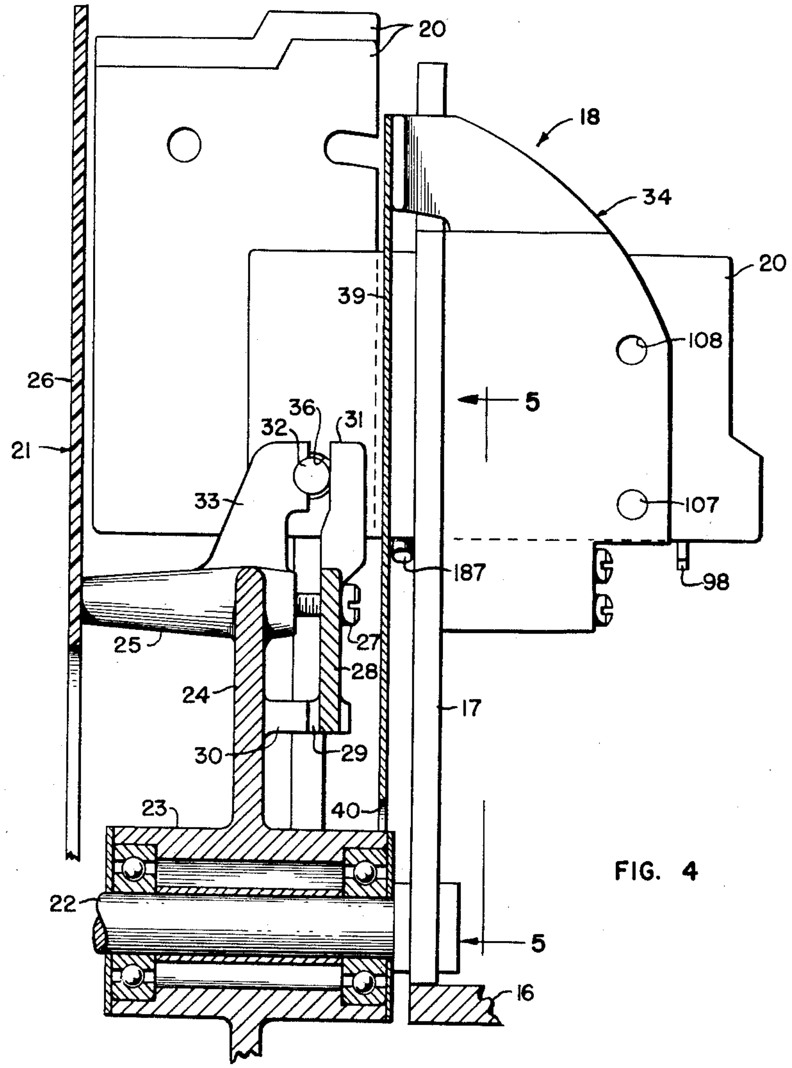
FIG. 4 is a fragmentary transverse sectional view, on an enlarged scale, taken substantially along the line 4—4 of FIG. 2 in the direciton of the arrows, showing details of construction of the card magazine.
Figure 5:
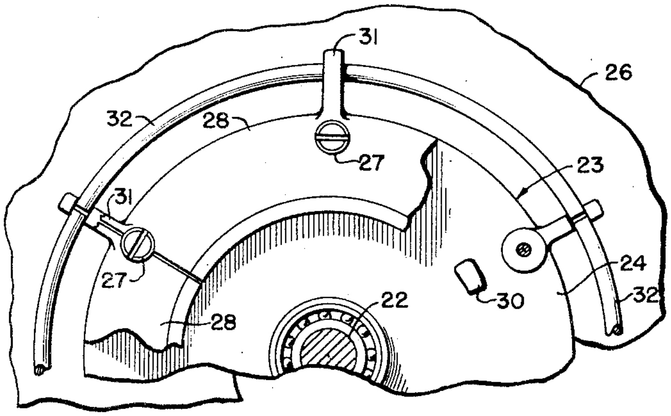
FIG. 5 is a fragmentary view, on a reduced scale, taken substantially along the line 5—5 of FIG. 4 in the direction of the arrows, showing portions of the card magazine in side elevation.

In the apparatus, a plurality of cards 20 are mounted in a rotatable magazine 21 which is freely rotatable about a removable shaft 22 (FIG. 4). The magazine comprises a hub portion 23 having a peripheral web or head 24 on which there are mounted, at spaced positions about its edge, a plurality of head-plate supporting projections 25 which, as shown most clearly in FIG. 4, extend to the left to support an annular head plate 26. The head supporting projections 25 extend outwardly on both sides of the peripheral web 24 and at the right side (FIG. 4) of the head-plate supporting projections 25, the projections are threaded to receive machine screws 27. These machine screws serve to force clamping ring segments 28 to the left (FIG. 4). Each of the clamping ring segments 28 has shoulders 29 on it which are arranged to engage a series of projections 30 extending axially from the web 24 and to carry clamping arms 31 into engagement with card supporting rods 32 thereby to clamp these rods 32 against notched projections 33 extending radially outwardly from each of the head supporting projections 25.

The card supporting rods 32 are arcuately formed and each of them pivotally supports a plurality of cards 20 so that the cards may be individually tilted or rocked about its associated rod 32 to move a major portion of a selected card 20 out of the magazine and into a card receiving fixture designated generally by the numeral 34. There are three of these arcuately shaped rods 32 provided and the rods are arranged so that they extend completely around the hub portion 23 of the magazine 21 and are readily removable to permit the removal or insertion of new cards into any desired section of the magazine 21.

Figure 2:
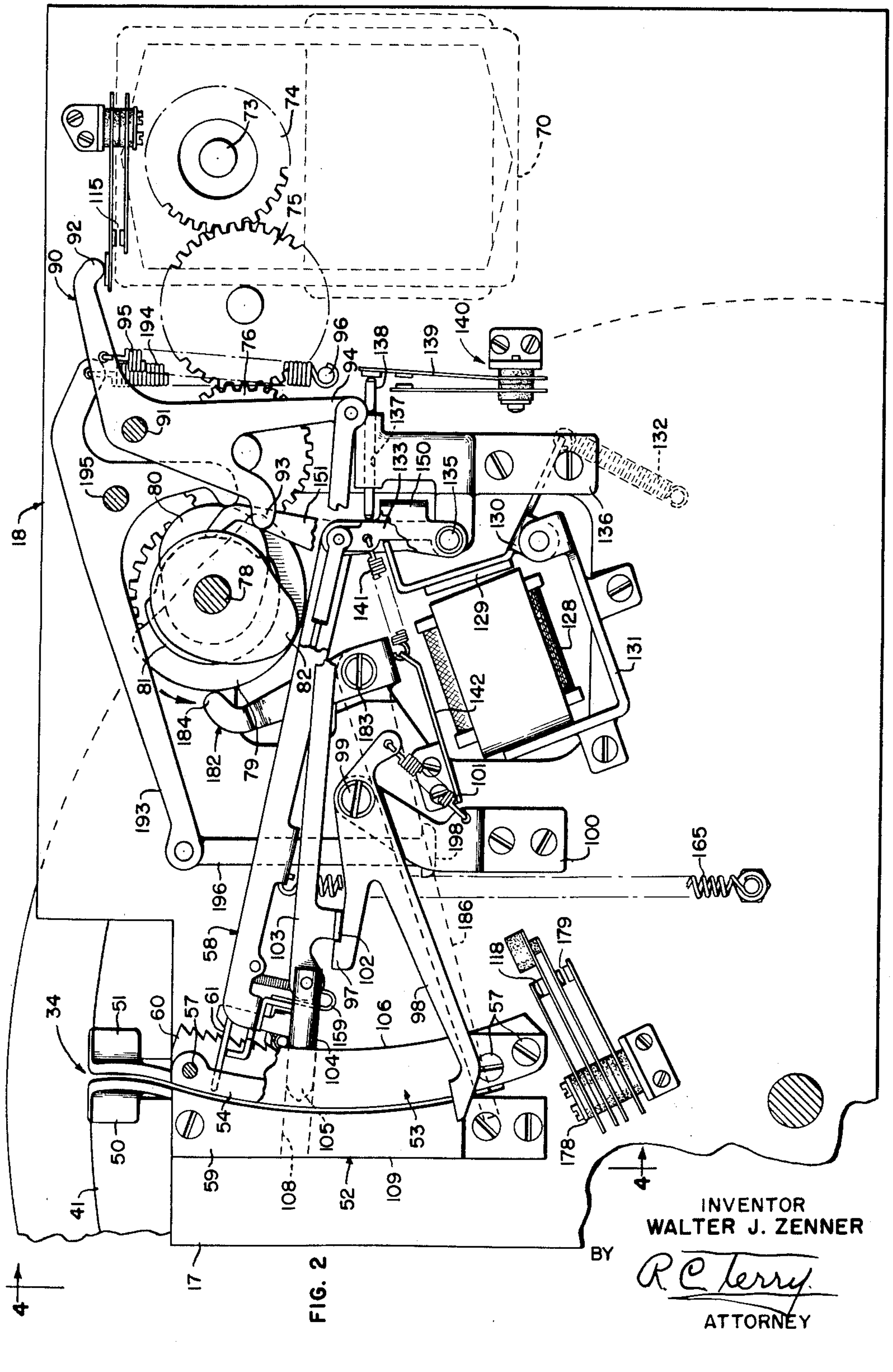
FIG. 2 is a longitudinal view of a portion of the storage transmitter, with the cover removed, showing the mechanism for effecting card reading and the card handling mechanism.
Figure 3:
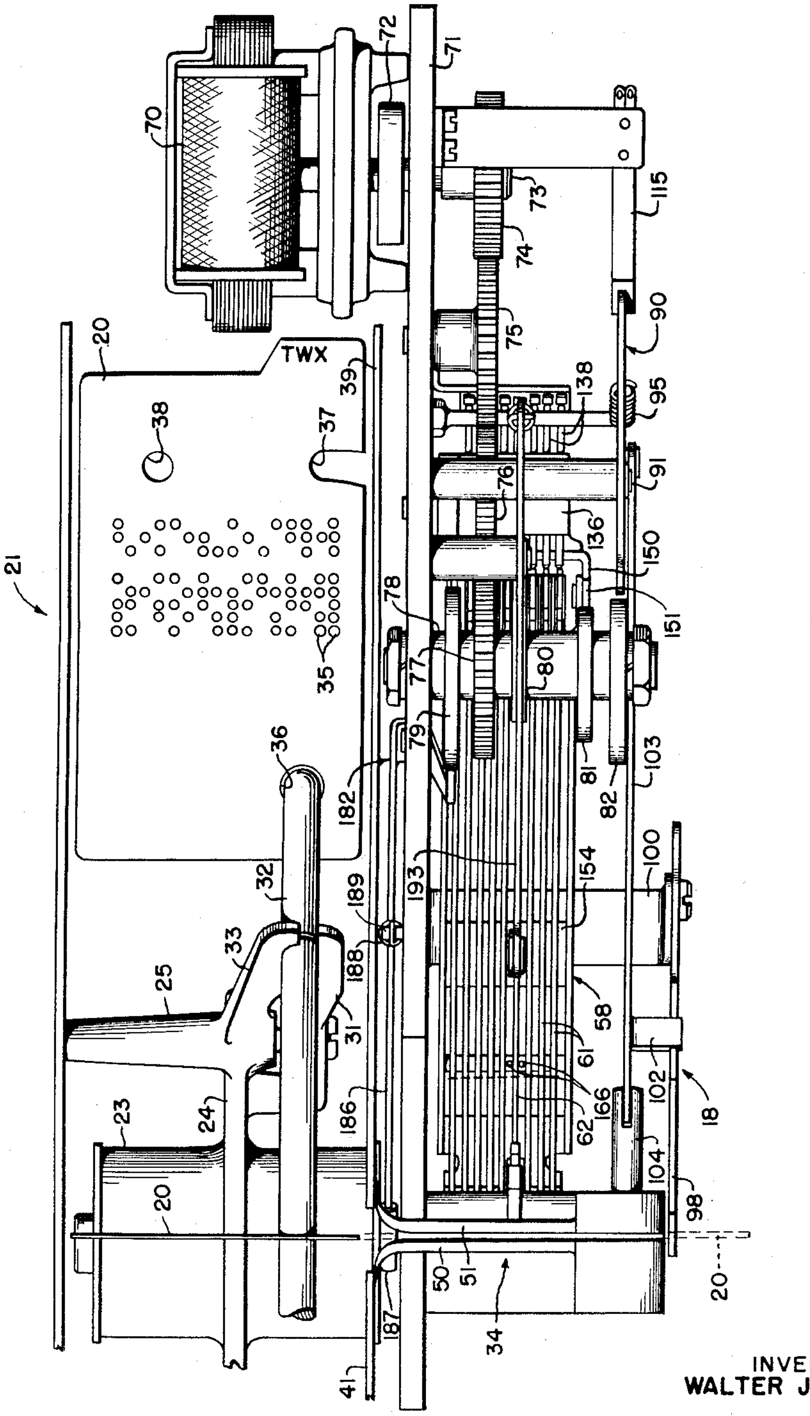
FIG. 3 is a plan view of the mechanism shown in side elevation in FIG. 2.

The cards 20 in the magazine have code perforations 35 in them, as illustrated in FIG. 3, and the cards are provided with mounting apertures 36 by means of which the cards may be pivotally mounted on the rods 32. In addition to the permutation code perforations 35 and the mounting aperture 36 in each card, each card is provided with a locating notch 37 and a locating aperture 38, this notch and this aperture serve to locate the card properly in the card receiving fixture 34. The cards are maintained in position in the magazine 21 by a head plate 39 (FIGS. 3 and 4) which is suitably fixed to the main support plate 17 in spaced relation thereto and which is provided with a central aperture 40 in the area of the hub portion 23 of the magazine 21. The head plate 39 has a relatively wide slot 41 formed in it (FIGS. 2 and 3) which is in alignment with the card receiving fixture 34 whereby the cards 20 may be tilted or rocked about the rods 32 to feed the cards individually into the card receiving fixture 34.

The card magazine 21 is so arranged that an operator may rotate it to bring any one of the cards 20 into alignment with the card receiving fixture 34 and when the selected card 20 is in alignment with the card receiving fixture 34, the operator may tilt the card 20 down into the fixture 34 whereupon the information contained in the card 20 in the form of permutation code perforations 35 will automatically be read by the reader 18 and the card will be automatically returned to its place in the magazine.

The card receiving fixture 34 is mounted on the main support plate 17 and comprises a pair of entrance guide members 50 and 51 (FIGS. 2 and 3) which serve to guide a card in its movement from the magazine 21 into position between a rear guide assemblage 52 and a front guide assemblage 53, when the card is tilted out of the magazine. The front guide assemblage 53 (FIG. 8) comprises a plurality of plates 54 held in spaced relation by a plurality of spacers 55 and mounted on a support block 56 which is in turn attached to the main support plate 17. The assemblage of spacers 55 and plates 54 are mounted on the support block 56 by means of machine screws 57. The left side of the plates 54 as viewed in FIG. 2 are curved to engage a card 20 which is bent on the arc of a circle such that a carriage designated generally by the numeral 58, may be oscillated about a pivot point in travelling over the face of the card 20 in an arcuate path and may read the perforations in the card, as will be described hereinafter.

The rear guide assemblage 52 is also made up of a plurality of plates 59 separated by suitable spacers and the plates 59 are aligned with the plates 54. The front right edges of the plates 59 as viewed in FIG. 2 are curved on an arc having the same axis as the arc of curvature of the left side of the plates 54 and are spaced from the left front edges just slightly more than the thickness of a card, so that a card which has been directed through the entrance guide members 50 and 51 will be directed into position between the rear guide assemblage 52 and front guide assemblage 53.

Figures 6, 7, 8:
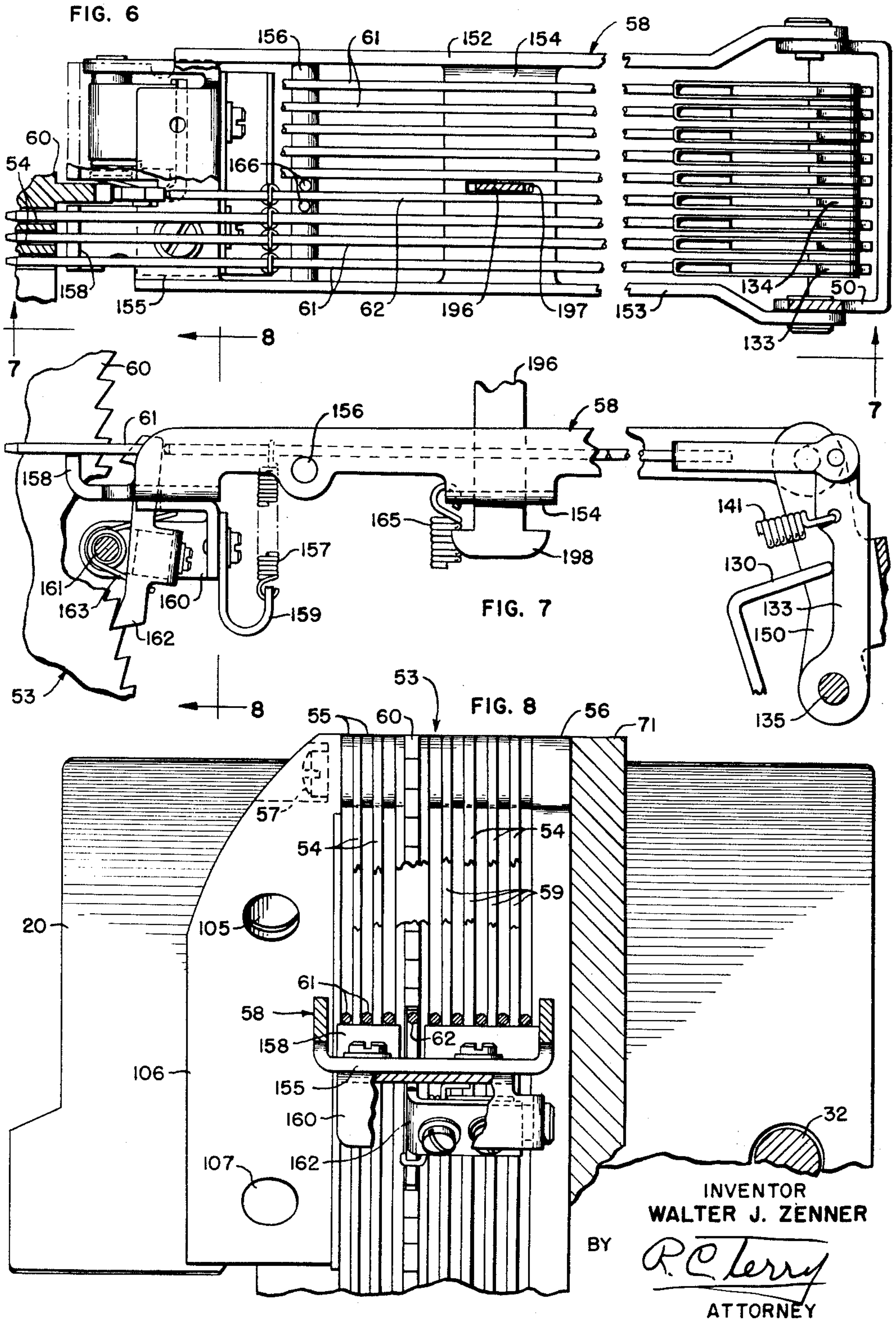
FIG. 6 is a fragmentary plan sectional view taken substantially along the line 6—6 of FIG. 2, in the direction of the arrows, showing the carriage which is movable across the face of the card to read perforations in the card and is on an enlarged scale as compared with FIG. 2.
FIG. 7 is a view taken substantially along the line 7—7 of FIG. 6 showing a side view of the carriage which travels across the face of the card, parts being broken away, more clearly to illustrate other parts of the apparatus.
FIG. 8 is a transverse sectional view taken substantially along the line 8—8 of FIG. 7 in the direction of the arrows showing details of construction of the carriage operating mechanism.

The front guide assemblage 53 also includes, as shown most clearly in FIG. 8, a ratchet 60 which is positioned between the second and third plates 54, counting from the left (FIG. 8) for controlling the stepping of the carriage 58 across the face of a card 20 positioned between the rear and front guide assemblages 52 and 53. Thus, since there are 8 possible rows of perforations 35 in each card 20 in the magazine 21, there are six of the plates 54 provided and these plates together with the side edges of the ratchet 60 serve to guide the free ends of a plurality of sensing pins 61. As shown in the broken away portion of FIG. 8, there are eight of the plates 59 provided in the rear guide assemblage 52 since the sensing pins 51 need to be guided in the rear assemblage which does not have an element similar to the ratchet 60. A pawl actuating pin 62, similar to the sensing pins 61, is positioned in alignment with the ratchet 60 in the same plane as the sensing pins 61.

The main support plate 17 has mounted on it a motor 70 which drives the shaft 71 having an electro-magnetically controlled single revolution clutch 72 for connecting the shaft 71 to a shaft 73. The clutch 72 may be of any suitable construction such, for example, as is shown in the patent to A. N. Nilson et al., No. 2,568,249, issued September 18, 1951. A driving gear 74 is fixed to the shaft 73 and through a pair of idler gears 75 and 76, drives a driven gear 77 fixed to a cam shaft 78. The cam shaft 78 is suitably journalled in the support plate 17 and carries four cams, that is, a card return cam 79, a carriage return cam 80, an escapement release cam 81, and a plunger retracting cam 82.

In the normal, inactive condition of the apparatus, a plunger retracting cam lever 90 mounted on a pivot stud 91, which in turn is mounted on the main support plate 17, is held in an inoperative position. The plunger retracting cam lever 90 has three arms 92, 93 and 94. The arm 93 is normally urged toward the plunger retracting cam 82 by a contractile spring 95 which is fixed to the lever arm 92 and to a pin 96 mounted on the main support plate 17. However, in the inactive condition, the plunger retracting cam lever 90 is latched in the position shown in FIG. 2, by a latching shoulder 97 on a bell crank lever 98. The bell crank lever 98 is pivoted on a pivot stud 99 fixed to a bracket 100 which is in turn mounted on the main support plate 17. The bell crank lever 98 is urged to rock in a clockwise direction about its pivot stud 99 by a contractile spring 101 to hold its latching shoulder 97 in the path of a latching projection 102 on a plunger actuating rod 103. The plunger actuating rod 103 is pivotally connected to the arm 94 of the plunger retracting cam lever 90 and thus when the projection 102 is engaged by the latching shoulder 97, the arm 93 of the cam lever 90 will be held out of engagement with its associated plunger retracting cam 82 (FIG. 2). At its left end (FIG. 2), the plunger actuating rod 103 carries a locating plunger 104 which has its left end tapered to facilitate its entrance into a card 20 that has been tilted out of the magazine 21 and guided down between the rear and front guide assemblages 52 and 53. The card 20 will be accurately located between these two guide assemblages 52 and 53 by the locating plunger 104 which is slidable in an aperture 105 in a guide bracket 106 which forms a part of the front guide assemblage 53.

As a card 20 is tilted out of the magazine 21 and down into a position where the locating plunger 104 may enter the aperture 38 in the card, the locating notch 37 in the card 20 will engage a pin 107 which extends across the gap between the rear and front guide assemblages 52 and 53. When the card 20 is moved down into position between the rear and front guide assemblages 52 and 53 and as it approaches the end of its travel between these two assemblages, the card will strike the bell crank lever 98 thus to release the plunger actuating rod 103 and permit the locating plunger 104 to pass through the locating aperture 38 to accurately locate the card 20 in position to be read. The locating plunger 104 in passing through the card, enters, a guide aperture 108 which is aligned with the aperture 105 and which is formed in a guide bracket 109 that cooperates with the guide bracket 106.

Figure 9:
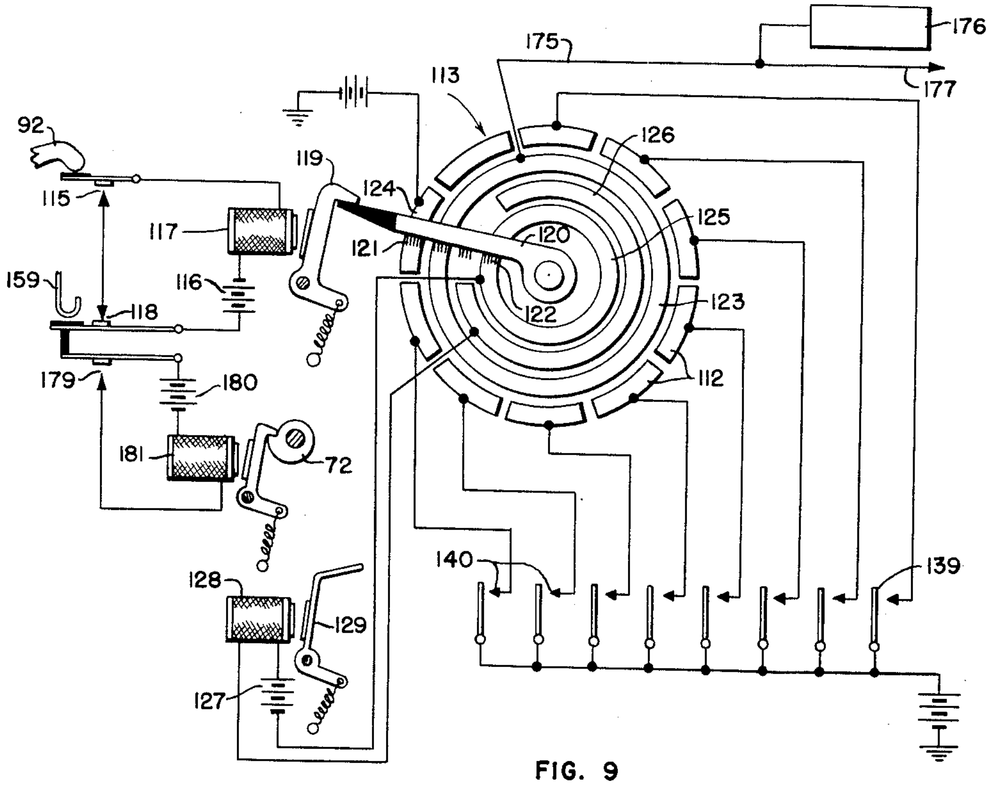
FIG. 9 is a circuit diagram illustrating the electrical connections extending from the reader mechanism to a distributor for controlling the transmission of the information permutatively represented in a card.

When the plunger actuating rod 103 is released by the bell crank lever 98, the arm 92 of the plunger retracting cam lever 90 will close a contact pair 115 (FIGS. 2 and 9). The contact pair 115, on closing, will supply energizing current from a source 116 to a distributor clutch magnet 117, of a distributor 113, in a circuit through a normally closed contact pair 118 connected in series with the contact pair 115 and the source 116, to move a brush controlling armature 119 out of engagement with a brush lever 120 that is continually urged to rotate through a friction clutch connected to a power source (not shown). The brush lever 120 has a pair of brushes 121 and 122 mounted on it for engagement with commutator segments individually associated with them. The brush 121 serves to interconnect a continuous commutator ring 123 sequentially with ten segments 112 equally spaced about the distributor assembly. As shown in FIG. 9, the brush 121 is in its stop position where it interconnects the continuous ring 123 with a stop segment 124 and the brush 122 is in engagement with a continuous ring 125 and is disengaged from a segment 126. The segment 126 is broken away at the area where the brush lever 120 is in the normal or stop condition and is continuous from a point just after the brush lever 120 starts to rotate until the brush lever 120 arrives at the stop position. Shortly after the brush 120 is released by the armature 119, the brush 122 will engage the segment 126 to supply current from a source 127 through the ring 125 and segment 126 to an electromagnet 128 (FIGS. 2 and 9).

The electromagnet 128 (FIG. 2) is suitably mounted on the main support plate 17 and has an armature 129 associated with it which is mounted on an armature lever 130. The armature lever 130 is pivoted on a bracket 131 and is urged to rock in a clockwise direction by a contractile spring 132 fixed to one of its ends and to the main support plate 17. As shown in FIGS. 2 and 7, the upper end of the armature lever 130 is bent over to engage a plurality of sensing pin levers 133 and a pawl actuating lever 134 all of which are pivoted on a pivot shaft 135. The pivot shaft 135 is mounted on a bracket 136 (FIG. 2) which is in turn mounted on the main support plate 17. The bracket 136 has a plurality of guide apertures 137 formed in it near its upper end (FIG. 2) for slidably supporting contact actuating pins 138 (see also FIG. 3). Each of the contact actuating pins is aligned with a movable contact spring 139 of a contact pair 140, there being one contact pair 140 associated with each of the contact actuating pins 138. The movable contact spring 139 is biased to the left (FIG. 2) tending to close the contact pair 140 but is held in its flexed condition when the electromagnet 128 is de-energized due to the fact that the bent end of the armature lever 130 will push all of the sensing pin levers 133 to the right (FIG. 2) against the action of springs 141 individual to the levers 133. The springs 141 are individually attached to the levers 133 and one of them is attached to the pawl actuating lever 134 to tend to move these levers in a counterclockwise direction about the pivot shaft 135. The springs 141 are attached to the levers 133 and 134 and to a spring bracket 142 which is suitably mounted on the main support plate 17.

The pivot shaft 135 also pivotally supports a carriage actuating bail 150 which is pivotally attached to the carriage 58. The carriage actuating bail 150 has an upwardly extending arm 151 (FIG. 2) a portion of which bears on the escapement release cam 81. The carriage actuating bail 150 is resiliently urged to rock in a counterclockwise direction to hold the upper end of the arm 151 against the surface of the cam 81 thus to hold the carriage 58 in the position shown in FIG. 2, 3, 6 and 7.

The carriage 58 comprises, as best seen in FIGS. 6 and 7, a pair of side plates 152 and 153 which are pivotally attached to the carriage actuating bail 150 and which are joined together adjacent their mid-portions by a cross plate 154 and adjacent their left end portion (FIG. 6) by a cross plate 155. A guide rod 156 is suitably fixed to the side plates 152 and 153 at a point between the cross plates 154 and 155, and serves to support on its upper surface, the sensing pins 61 and the pawl actuating pin 62. The pawl actuating pin 62 and the sensing pins 61 are resiliently urged to engage the guide rod 156 by contractile springs 157 individual to them which serve to hold the pins 61 and 62 against the guide rod 156. The left end portions of the sensing pins 61 are also guided by a split guide projection 158 which is bent upwardly from the cross plate 155 as seen most clearly in FIGS. 6 and 7. The springs, 157, which hold the sensing pins 61 and pawl actuating pin 62 down against the guide rod 156, have their upper end turns bent over to encircle the pins and have their lower end turns fixed to a spring bracket 159 which is in turn mounted on a pawl supporting bracket 160 that is fixed to the cross plate 155.

The pawl supporting bracket 160 has a pivot 161 fixed to it on which there is mounted a double toothed pawl 162. The pawl 162 is urged to rock in a clockwise direction about the pivot pin 161 by a hairpin type spring 163 to carry its lower tooth into engagement with a tooth on the ratchet 60. The two teeth on the pawl 162 are so arranged that when the pawl is rocked counterclockwise against the action of the hairpin type spring 163, the upper tooth of the pawl will engage a tooth on the ratchet 60 and the lower tooth will be withdrawn from the tooth with which it had been in engagement. The proportion of the teeth on the double toothed pawl 162 and the teeth on the ratchet 60 is such that, when the pawl 162 is permitted to rock clockwise (FIG. 7) under the action of its spring 163, the lower tooth will abut the surface of the next succeeding tooth on the ratchet 60 and thus the pawl 162 and ratchet 60 serve as an escapement mechanism whereby upon repeated operation of the pawl 162, the carriage 58 will be permitted to move down step by step under the influence of a spring 165 attached to it and normally urging it to move downwardly. Since the pawl actuating pin 62 as well as the sensing pins 61 are urged to move to the left (FIGS. 3, 6 and 7), by their associated springs 141, each time the electromagnet 128 is energized and rocks its armature lever 130 counterclockwise, the double tooth pawl 126 will be actuated each time the sensing pins 61 and pawl actuating pin 62 are moved to the left (FIG. 7). In this manner, the sensing pins are associated step by step with various levels of perforations 35 in the cards 20 and the escapement mechanism will permit the carriage 58 to move down one step each time the electromagnet 128 is energized.

As pointed out hereinbefore, the free left ends of the sensing pins 61 are guided between the plates 54 and the side edges of the ratchet 60. However, the free end of the pawl actuating pin 62 does not extend between the plates 54 and therefore a pair of guide members 166 are fixed to the guide rod 156 to guide the pawl actuating pin 62. The ratchet 60 extends to the right (FIG. 2) beyond the right edges of the plates 54 and into a slot 167 between the two parts of the split guide projection 158.

With the carriage 58 in the position shown in FIG. 2, which is its normal, unoperated position, the sensing pins 61 are aligned with the top row of perforations 35 in the card 20 which has been moved into position between the guide assemblages 52 and 53. As the brush lever 120 goes through one cycle of rotation, it will move the brush 121 out of the stop position and into the start position of the distributor and will then sequentially engage the brush 121 with the segments 112. As the brush lever 120 moves out of the stop position into the start position, the brush 122 will interconnect the segments 125 and 126 to supply energizing current from the source 127 to the electromagnet 128 and in so doing will release all of the sensing pins 61 and the pawl actuating pin 62 so that their springs may move them to the left, FIGS. 2, 3, 6 and 7. When the pawl actuating pin 62 moves to the left, FIGS. 6 and 7, it will rock the pawl 162 counterclockwise (FIG. 7) about its pivot pin 161 and in so doing will release the bottom tooth of the pawl 162 from the teeth of the ratchet 60 and will engage the upper tooth of the pawl 162 with the teeth of the ratchet 60.

The pins 61, in being released by the armature 129 of the electromagnet 128, will engage the face of the card in the card receiving fixture 34 and thus pins 61 which find code perforations 35 in the top row of the card 20 will pass through the card to close the contact pairs 140 associated with them to supply current through the contact pair to the segment 112 associated with the closed contact pairs in the distributor 113. Thus as the brush 121 of the distributor 113 closes a circuit between the commutator ring 123 and the segments 112, those segments 112, which have had battery supplied to them through their associated contact pairs 140 that have been closed, will send current out over a lead 175 which may be directed to a reperforator 176 shown diagrammatically in FIG. 9 or to a transmission line 177.

As the brush lever 120 completes its single cycle of revolution, it will, as it enters the stop position, break the circuit between the commutator ring 125 and the segment 126 to de-energize electromagnet 128 thus to restore all of the sensing pins 61 and the pawl actuating pin 62 to their inactive position as shown in FIG. 2. When the pawl actuating pin 62 is returned to its normal or inactive position, as shown in FIG. 6, it will permit the spring 163 to move the pawl 162 to the position shown in FIG. 7 and in so doing, it will first release the upper tooth of the pawl 162 from the tooth of ratchet 60 which it had been engaging and will permit the spring 165 to move the carriage 58 down one step thus to bring the sensing pins 61 into alignment with the second row of perforations 35 in the card 20. This movement of the sensing pins 61 to the left and actuation of the pawl 162 will occur once in each cycle of the brush lever 120 and will continue so long as the electromagnet 117 is held energized.

The carriage 58 will move downwardly step by step, under the influence of the spring 165 and under the control of the pawl 162, to sense every row of perforations 35 in the card 20. As the carriage 58 is moved to a point where the sensing pins 61 are aligned with the bottom row of code perforations 35 in the card 20, the spring bracket 159 will engage the normally closed contact pair 118 to break the circuit from the source 116 to the distributor clutch magnet 117. As will be seen by reference to FIG. 2, the contact pair 118 is mounted on a bracket 178 suitably supported on the main support plate 17 as is a normally open contact pair 179. The normally open contact pair 179 will be closed by the spring bracket 159 at approximately the same time that the contact pair 118 is opened and will supply actuating current from a source 180 to the electromagnet 181 of the single revolution clutch 72 to trip the clutch 72 and initiate a cycle of rotation of the cam shaft 78. When the contact pair 118 is opened by the spring bracket 159, the electromagnet 117 will be de-energized and at the end of its cycle of rotation, the brush lever 120 will be blocked against further rotation.

Figure 10:
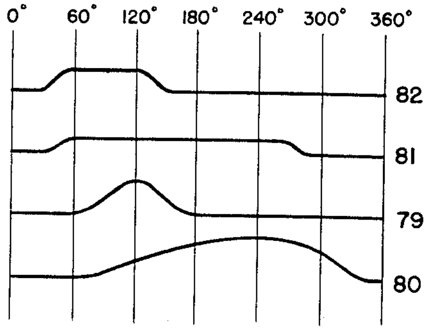
FIG. 10 is a timing diagram illustrating the relative timing of the operation of various portions of the card reading mechanism.

When a cycle of rotation of the cam shaft 78 is initiated by tripping the single revolution clutch 72, the cam 82 will first be effective to initiate rocking of the plunger retracting cam lever 90 in a counterclockwise direction to pull the plunger actuating rod 103 to the right, FIG. 2, and retract the locating plunger 104 from the locating aperture 38 in the card 20 at that time in the card receiving fixture 34. The time of operation of the cams is shown in FIG. 10 and it will be seen that the first operation started by a rotation of the cam shaft 78 is the operation of the cam 82 to retract the card locating plunger 105 from the card.

Shortly after the withdrawal of the plunger 105 from the locating aperture 38 in the card 20 is started, cam 81 will rock the carriage actuating bail 150 in a clockwise direction due to the cam 81 rocking the arm 151 clockwise. When the carriage actuating bail 150 is rocked clockwise about its pivot shaft 135, the carriage 58 will be moved to the right (FIGS. 2 and 7) and since the pawl supporting bracket 160 is fixed to the cross plate 155 of the carriage 58, the pawl 162 will be moved bodily to the right (FIG. 7) to disengage it completely from the ratchet 60.

Shortly after the pawl 162 is completely disengaged from the ratchet 60, the card return cam 79 will become effective to eject the card from the card receiving fixture 34. The card return cam 79 has a cam lever 182 associated with it. This cam lever 182 is pivoted on a pivot pin 183 which is fixed to the main support plate 17. The cam lever 182 has a cam engaging arm 184 which, as shown in FIGS. 2 and 3, is positioned adjacent to the front face of the support plate 17 and the cam lever 182 is bent to extend through an opening 185 in the main support plate 17 and has its other arm 186 located to the rear of the plate 17. The arm 186 carries a card engaging member 187 at its free end. The cam lever 182 is urged to rock in a clockwise direction (FIG. 2) by a contractile spring 188 fixed to the arm 186 and to a pin 189 fixed to the rear of the main support plate 17. Thus, when the low portion of the card return cam 79 moves into association with the cam engaging arm 184, the spring 188 will rock lever 182 in a clockwise direction. The card engaging member 187 at the end of arm 186 will engage the bottom edge of the card 20 which had been moved into the card receiving fixture 34 and will rock the card 20 about the card support rod 32 in a counterclockwise direction, as viewed in FIG. 4, to return the card which had been in the card receiving fixture 34 back into the magazine 21.

Very shortly after the card return cam 79 starts to eject a card 20 from the card receiving fixture 34 and return it to its position in the magazine 21, the carriage return cam 80 will have rotated to a position where the low portion of the cam 80 will be in association with a cam arm 192 of a carriage return bell crank lever 193. The bell crank lever 193 is normally urged to rotate in a clockwise direction by a contractile spring 194 that is attached to the bell crank lever 193 and to the pin 96. The bell crank lever 193 is mounted for oscillation about a pivot stud 195 mounted on the plate 17 and carries at its left end (FIG. 2) a carriage return rod 196 that extends through an aperture 197 formed in the cross plate 154 of the carriage 58. The carriage return rod 196 has a head 198 formed on it for engagement with the under surface of the plate 154, and the carriage return rod 196 is pivotally connected to the carriage return bell crank lever 193. When the bell crank lever 193 is rocked in a clockwise direction, the head 198 of the rod 196 will engage the under surface of the plate 154 and return the carriage 58 to its uppermost position. The contour of the carriage return cam 80 is such that the carriage will be held in its uppermost position where the sensing pins 61 will be aligned with the top row of perforations 35 in a card 20 that may later be inserted in the card receiving fixture 34, until after the escapement release cam 81 arrives at a position where the low portion of it is aligned with the carriage return actuating bail arm 151. Thus the escapement mechanism including the pawl 162 will be permitted to move over toward the ratchet 60 to hold the carriage 58 in its uppermost position until another card is inserted in the card receiving fixture to initiate another cycle of reading of the card. Since the spring 101 urges the bell crank lever 98 to rotate in a clockwise direction, the latching shoulder 97 on the lever 98 will be moved into the path of the latching projection 102 on the plunger actuating rod 103 as soon as the card 20 starts to move out of the card receiving fixture 34. This will occur prior to the time that the cam 82 permits the plunger actuating rod 103 to move to the left so that the plunger actuating rod 103 will be blocked from moving to its extreme left hand position (FIG. 2) by the bell crank lever 98 until a card 20 is inserted in the card receiving fixture 34.

*Operation*

In the operation of the apparatus, the supply of cards 20 in the magazine 21 may be selectively positioned in alignment with the card receiving fixture 34 by an operator manually rotating the card magazine 21 about the shaft 22, whereupon, the operator may rock or tilt a selected card 20 having the desired message or address on it into the fixture 34. When the operator rocks the card 20 into the fixture 34, the card will strike the bell crank lever 98 to disengage the latching shoulder 97 from the latching projection 102 on the plunger actuating rod 103 thus properly to locate a card in the card receiving fixture by permitting the locating plunger 104 to enter the locating aperture 38 in the card 20. As the plunger actuating rod 103 moves to the left (FIG. 2), the arm 92 on plunger retracting cam lever 90 will close contact pair 115 to initiate a reading cycle of the apparatus. When the contact pair 115 is closed, the distributor clutch magnet 117 will be tripped to initiate a plurality of cycles of rotation of the brush lever 120. In each cycle of rotation of the brush lever 120, the electromagnet 128 will be energized to permit the sensing pins 61 to move to the left (FIGS. 2, 6 and 7) to read a row of perforations 35 in the card 20. Upon de-energization of the electromagnet 128 at the end of each cycle of rotation of the brush lever 120, the sensing pins 61 will be retracted as will be the pawl actuating pin 62 and the carriage 58 carrying the pawl actuating pin 62 and sensing pins 61 will be stepped downward one step under the influence of its actuating spring 165. In each cycle of rotation of the brush lever 120, the carriage 58 will thus be stepped one step downwardly until it reaches the bottom of its travel to read the last row of perforations 35 in the card 20 at which time, a cycle of rotation of the shaft 78 will be initiated by the spring bracket 159 closing the contact pair 179 and the rotation of the brush lever 120 will be stopped by the de-energization of the distributor clutch magnet 117 which is in turn effected by the opening of the contact pair 118.

As the cam shaft 78 rotates through one complete cycle, the plunger retracting cam 82 will oscillate the plunger retracting cam lever 90 to retract the locating plunger 104 from the aperture 38 in the card 20 at that time in the card receiving fixture 34. After the plunger 104 is retracted from the card 20, the escapement release cam 81 will rock the carriage actuating bail 150 in a clockwise direction (FIG. 2) to disengage the escapement pawl 162 from the ratchet 60. After the pawl 162 is disengaged from the ratchet 60, the card return cam 79 will present its low portion to the cam engaging arm 184 of cam lever 182 and thereupon spring 188 will rock the cam lever 182 in a clockwise direction to rock the card engaging member 187 in an arcuate path to tilt or rotate the card 20 out of the card receiving fixture 34 and back into the magazine 21. As the card 20 is being returned to the magazine 21, the carriage return cam 80 will permit the contractile spring 194 to rock the carriage return bell crank lever 193 in a clockwise direction to move the head 198 of the carriage return rod 196 into engagement with the under surface of the cross plate 154 thus to move the carriage 58 back into the position shown in FIG. 2. After the carriage 58 has been returned to the position shown in FIG. 2, the escapement release cam will permit the carriage actuating bail 150 to rock in a counterclockwise direction to carry the pawl 162 back into engagement with the ratchet 60 thus to restore the apparatus to the condition shown in FIG. 2 where it is in condition to receive another card 20 in the card receiving fixture 34.

In each revolution of the brush lever 120, an 8 unit permutation code signal will be transmitted over the lead 175 to either a reperforator shown diagrammatically at 176 or to a line 177 and at the completion of the transmission of the permutation code signal, the carriage 58 will be stepped into alignment with the next succeeding row of perforations 35 on the card 20 in the card receiving fixture 34 to read the information represented by the permutation code perforations 35 and transmit it until the carriage 58 is moved over all of the rows of perforations 35 in the card 20 whereupon the card will be ejected and the apparatus restored to normal unoperated condition ready to receive another card which may be selected by the operator for insertion into the card receiving fixture 34.

Although a specific embodiment of the invention has been described hereinbefore, it will be understood that numerous modifications of the structure may be made without departing from the invention.

What is claimed is:

1. A printing telegraph storage transmitter comprising a magazine for containing a plurality of cards, each containing discrete message information in it in the form of a plurality of rows of code perforations in it, arcuately arranged guide assemblages for supporting a card to be read in a curved condition conforming to the arcuate arrangement of the guide assemblages, means for guiding a portion of a card to position between said guide assemblages while maintaining another portion thereof in the magazine, contact controlling sensing pins for detecting the presence of perforations in a row on said card, a carriage for supporting said sensing pins, means for causing said carriage to move the card engaging ends of the sensing pins in an arcuate path across the rows of perforations in a card positioned in said guide assemblages, a card locating plunger for positioning a card with its rows of perforations normal to the path of travel of the carriage, and means actuated by a card for initiating operation of said plunger.

2. A printing telegraph storage transmitter comprising a magazine for containing a plurality of cards, each containing discrete message information in it in the form of a plurality of rows of code perforations in it, guide assemblages for supporting a card to be read, means for guiding a portion of a card to position between said guide assemblages while maintaining another portion thereof in the magazine, contact controlling sensing pins for detecting the presence of perforations in a row of said card, a carriage for supporting said sensing pins, means for causing said carriage to move across the rows of perforations in a card positioned in said guide assemblages, a card locating plunger for positioning a card with its rows of perforations normal to the path of travel of the carriage, means actuated by a card for initiating operation of said plunger, and means for automatically restoring a card to its original position in the magazine after the card has been read.

3. A printing telegraph storage transmitter comprising a magazine for containing a plurality of cards, each containing discrete message information in it in the form of a plurality of rows of code perforations in it, guide assemblages for supporting a card to be read, means for guiding a portion of a card to position between said guide assemblages while maintaining another portion thereof in the magazine, contact controlling sensing pins for detecting the presence of perforations in a row on said card, a carriage for supporting said sensing pins, means for causing said carriage to move across the rows of perforations in a card positioned in said guide assemblages, a card locating plunger for positioning a card with its rows of perforations normal to the path of travel of the carriage, means actuated by a card for initiating operation of said plunger and means for sequentially withdrawing the plunger from operative association with a card and restoring said card to its original position in the magazine after said card has been read.

4. In a printing telegraph storage transmitter, a rotary card magazine rotatable about a predetermined axis, a rod mounted in said magazine and curved in an arc about said predetermined axis, a plurality of cards mounted in said magazine and pivotally mounted on said rod, each of said cards having permutation code perforations in a predetermined field thereof, a card receiving fixture positioned adjacent said magazine for receiving a portion of the card containing the field when a card is moved part way out of said magazine by pivoting it about the rod, means for reading the perforations in said field of a card in said fixture including means for traversing the field of the card and transmitting the information represented by the permutation code perforations in the field of the card, means in said fixture for returning said card to its original position in said magazine at the termination of the reading of the card, and card locating means for accurately locating the card in the fixture.

5. In a printing telegraph storage transmitter, a rotary card magazine rotatable about a predetermined axis, a rod mounted in said magazine and curved in an arc about said predetermined axis, a plurality of cards mounted in said magazine and pivotally mounted on said rod, each of said cards having permutation code perforations in a predetermined field thereof, a card receiving fixture positioned adjacent said magazine for receiving a portion of the card containing the field when a card is moved part way out of said magazine by pivoting it about the rod, means for reading the perforations in said field of a card in said fixture including means for traversing the field of the card and transmitting the information represented by the permutation code perforations in the field of the card, means in said fixture for returning said card to its original position in said magazine at the termination of the reading of the card, card locating means for accurately locating the card in the fixture, and means actuated by a card in moving into position in the fixture for releasing said card locating means to render the card locating means effective.

6. In a printing telegraph storage transmitter, a rotary card magazine rotatable about a predetermined axis, a rod mounted in said magazine and curved in an arc about said predetermined axis, a plurality of cards mounted in said magazine and pivotally mounted on said rod, each of said cards having permutation code perforations in a predetermined field thereof, a card receiving fixture positioned adjacent said magazine for receiving a portion of the card containing the field when a card is moved part way out of said magazine by oscillating it about the rod, reading means for traversing the field of the card in said fixture and transmitting the information represented by the permutation code perforations in the card, means in said fixture for returning said card to its original position in said magazine at the termination of the reading of the card, said reading means including a carriage having sensing pins thereon and movable step by step across the face of a card which has been pivoted out of the magazine into the fixture, and means actuated by said carriage after it has traversed the field of the card for returning the card to its original position in the magazine.

7. In a printing telegraph storage transmitter, a magazine for holding the plurality of perforated cards each containing fixed message information in the form of rows of permutation code perforations in a portion thereof, a card receiving fixture positioned adjacent to the magazine for receiving the portion of the card containing the code perforations, means in said magazine for tiltably supporting the cards so that they may be tilted individually part way out of the magazine to move the portion of a card containing the code perforations into said fixture, means in said fixture for actuation by a card tilted part way into the fixture for initiating a card reading cycle including a latch means, a plunger normally held in a retracted position by said latch means and released by said latch means when the card in moving into said fixture initiates a card reading cycle, a contact pair closed by said plunger upon its release by said latch, a distributor, a single revolution clutch for controlling the operation of said distributor and rendered effective upon the closure of said contact pair to initiate a cycle of operation of the distributor, a plurality of sensing pins for engagement with the portion of a card having the permutation code perforations in it when said portion of said card is in said fixture, a carriage oscillatably mounted for movement across the face of said card for carrying said sensing pins into association with rows of perforations in said portion of said card, an electromagnet having an armature which normally holds said sensing pins retracted from said card, means in said distributor for energizing said electromagnet in each cycle of said distributor to release said pins and permit them to move into engagement with said card, a pawl and ratchet mechanism also controlled by said electromagnet for controlling the movement of said carriage across the face of said card, a cam shaft, means actuated by said carriage at the end of its travel across the said portion of said card for initiating a cycle of rotation of said cam shaft, and for disabling the distributor clutch magnet thus to stop the operation of the distributor, a plurality of cam means on said cam shaft, and means actuated by said cam means for retracting said plunger from said card, disabling said ratchet means, ejecting said card from said fixture and returning it to its original position in said magazine, and returning said carriage to position to travel across the face of a succeeding card tilted from the magazine into the fixture.

8. A printing telegraph storage transmitter, which comprises a magazine containing a plurality of indicia bearing cards, sensing means mounted pivotally on said transmitter adjacent said magazine, card receiving and supporting means mounted on said transmitter adjacent said sensing means and including card positioning assemblages providing confronting arcuate surfaces formed along arcs struck on the axis of said pivotally mounted sensing means, means for initiating operation of said sensing means upon the placement of a card in said card receiving and supporting means to cause said sensing means to pivotally traverse said card, and means operable upon the completion of a card traversal to remove said card from said card receiving and supporting means.

9. A printing telegraph storage transmitter, which comprises a magazine for supporting pivotally a plurality of indicia bearing cards, card sensing means mounted pivotally on said transmitter adjacent said magazine, card receiving and positioning means mounted on said transmitter adjacent said sensing means and including card positioning assemblages providing confronting and spaced apart arcuate surfaces formed along arcs struck on the axis of said pivotally mounted sensing means for positioning a card accurately in a predetermined arcuate relationship with respect to said sensing means, means for initiating operation of said sensing means upon pivotal movement of a card partially out of said magazine and into position between said arcuate surfaces to cause pivotal traversal of said positioned card by said sensing means, and means operable upon the completion of a card traversal to pivot said card out of said card receiving and positioning means and back wholly within said magazine.

10. A printing telegraph storage transmitter, which comprises a magazine for supporting pivotally a plurality of cards containing message information in the form of a plurality of rows of code perforations, a plurality of contact controlling sensing pins for detecting the presence of perforations in a row on said card, a pivotable carriage for carrying said sensing pins in an arcuate path, card receiving and flexing means including card positioning assemblages providing confronting and spaced apart arcuate surfaces formed along arcs struck on the axis of said pivotable carriage, said arcuate surfaces adapted to position a card in the cylindrical path defined by the ends of said sensing pins and the member closer to said carriage having a plurality of openings formed therein to expose the card perforations to said sensing pins, a trip lever engageable by a card pivoted partially out of said magazine and placed between said arcuate surfaces and operable upon said engagement to cause said carriage to pivotally traverse a positioned card to successively present said sensing pins to the rows of perforations and means operable upon the completion of traversal of a card by said sensing pins to return said positioned card wholly within said magazine.

11. A printing telegraph storage transmitter, which comprises a magazine for supporting pivotally a plurality of indicia bearing cards, card sensing means mounted pivotally on said transmitter adjacent said magazine, card receiving and flexing means mounted on said transmitter adjacent said sensing means and including card positioning assemblages providing confronting and spaced apart arcuate surfaces formed along arcs struck on the axis of said pivotally mounted sensing means, said arcuate surfaces adapted to position a card in the cylindrical path traversed by said sensing means and adapted to flex said card to minimize unwanted movement of the card with respect to the positioning assemblages by establishing surface contact between a positioned card and the arcuate surfaces, a trip lever engageable by a card pivoted partially out of said magazine and placed between said arcuate surfaces and operable upon said engagement to initiate operation of said sensing means to cause pivotal traversal of the positioned and flexed card by said sensing means, a pivotally mounted card return arm disposed below said arcuate surfaces, and means mounted below said arcuate surfaces and operable upon the engagement thereof by said sensing means, upon the completion of the traversal of the positioned card, to actuate said card return arm to remove said positioned card from between said arcuate surfaces and return said card wholly within said magazine.

12. A printing telegraph storage transmitter, which comprises a drum-like magazine for supporting a plurality of cards for rotation with the magazine and for pivotal movement individually in a direction lateral to said magazine, each card having a plurality of rows of code perforations and a locating aperture formed therein, contact controlling sensing pins for indicating the presence of perforations in each row of a card, a pivotable carriage for supporting said sensing pins, cards receiving and flexing means including card positioning assemblages providing confronting and spaced apart arcuate surfaces formed along arcs struck on the axis of said carriage and having card locating apertures formed therein, the arcuate surface closer to said carriage having a plurality of openings formed therein to expose the rows of perforations in a positioned card to said sensing pins, a card locating plunger operable to enter the card locating apertures formed in said arcuate surfaces and the locating aperture in said card and thereby fixedly position said card in a predetermined arcuate relationship in the path of said sensing pins, a trip lever engageable by a card pivoted partially out of said magazine and placed between said arcuate surfaces and operable upon said engagement to actuate said plunger to cause a pivotally mounted card return arm disposed below said arcuate surfaces, and means mounted below said arcuate surfaces and engageable by said carriage upon the completion of the sensing of the rows of perforations in a card, to withdraw said plunger from said apertures and to actuate said card return arm to return said positioned card wholly within said magazine.

References Cited in the file of this patent

UNITED STATES PATENTS

| | | |
|---|---|---|
| 899,671 | Lebeis | Sept. 29, 1918 |
| 1,865,074 | Baber | June 28, 1932 |
| 1,908,944 | Baber | May 16, 1933 |
| 2,918,656 | Nolde | Dec. 22, 1959 |